US009563290B2

(12) United States Patent
Niwa et al.

(10) Patent No.: US 9,563,290 B2
(45) Date of Patent: Feb. 7, 2017

(54) INPUT DEVICE, INPUT VALUE CORRECTION METHOD, AND PROGRAM

(71) Applicant: Konica Minolta, Inc., Tokyo (JP)

(72) Inventors: Takamasa Niwa, Tokyo (JP); Keiichiro Hyodo, Tokyo (JP); Tetsuhiro Shibata, Tokyo (JP); Yasuhiko Yamaguchi, Tokyo (JP); Masayuki Inoue, Tokyo (JP); Kenta Hosaka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 196 days.

(21) Appl. No.: 14/528,396

(22) Filed: Oct. 30, 2014

(65) Prior Publication Data
US 2015/0116248 A1    Apr. 30, 2015

(30) Foreign Application Priority Data

Oct. 31, 2013  (JP) .................................. 2013-227167

(51) Int. Cl.
G06F 3/041       (2006.01)
G06F 3/0354      (2013.01)
G06F 3/0488      (2013.01)

(52) U.S. Cl.
CPC ........... *G06F 3/03545* (2013.01); *G06F 3/041* (2013.01); *G06F 3/04883* (2013.01); *G06F 3/0418* (2013.01)

(58) Field of Classification Search
None
See application file for complete search history.

(56) References Cited

U.S. PATENT DOCUMENTS

| 2002/0067854 | A1  | 6/2002 | Reintjes et al. |
| 2013/0176247 | A1  | 7/2013 | Jogo et al. |
| 2014/0098041 | A1* | 4/2014 | Ji ........................ G06F 3/0488 345/173 |

FOREIGN PATENT DOCUMENTS

| EP | 1933228 A2 * | 6/2008 | .......... G06F 3/0416 |
| EP | 1933228 X    | 6/2008 | |
| EP | 2042937 Y    | 4/2009 | |
| JP | 2006-172230 A | 6/2006 | |

OTHER PUBLICATIONS

European Search Report date Feb. 15, 2015 from the corresponding European application No. 14190320.3-1972.

* cited by examiner

*Primary Examiner* — Ilana Spar
*Assistant Examiner* — Kirk Hermann
(74) *Attorney, Agent, or Firm* — Lucas & Mercanti, LLP

(57) ABSTRACT

An input device includes: an input detector that detects a portion of a detection surface pressed by a position specifying object via a sheet placed on the detection surface; a correction information acquisitor that acquires correction information to correct a difference between a shape of a contact portion of the position specifying object in contact with the sheet and a shape of a portion pressed by the contact portion detected by the input detector; and a corrector that corrects a value detected by the input detector on the basis of the correction information acquired by the correction information acquisitor.

19 Claims, 11 Drawing Sheets

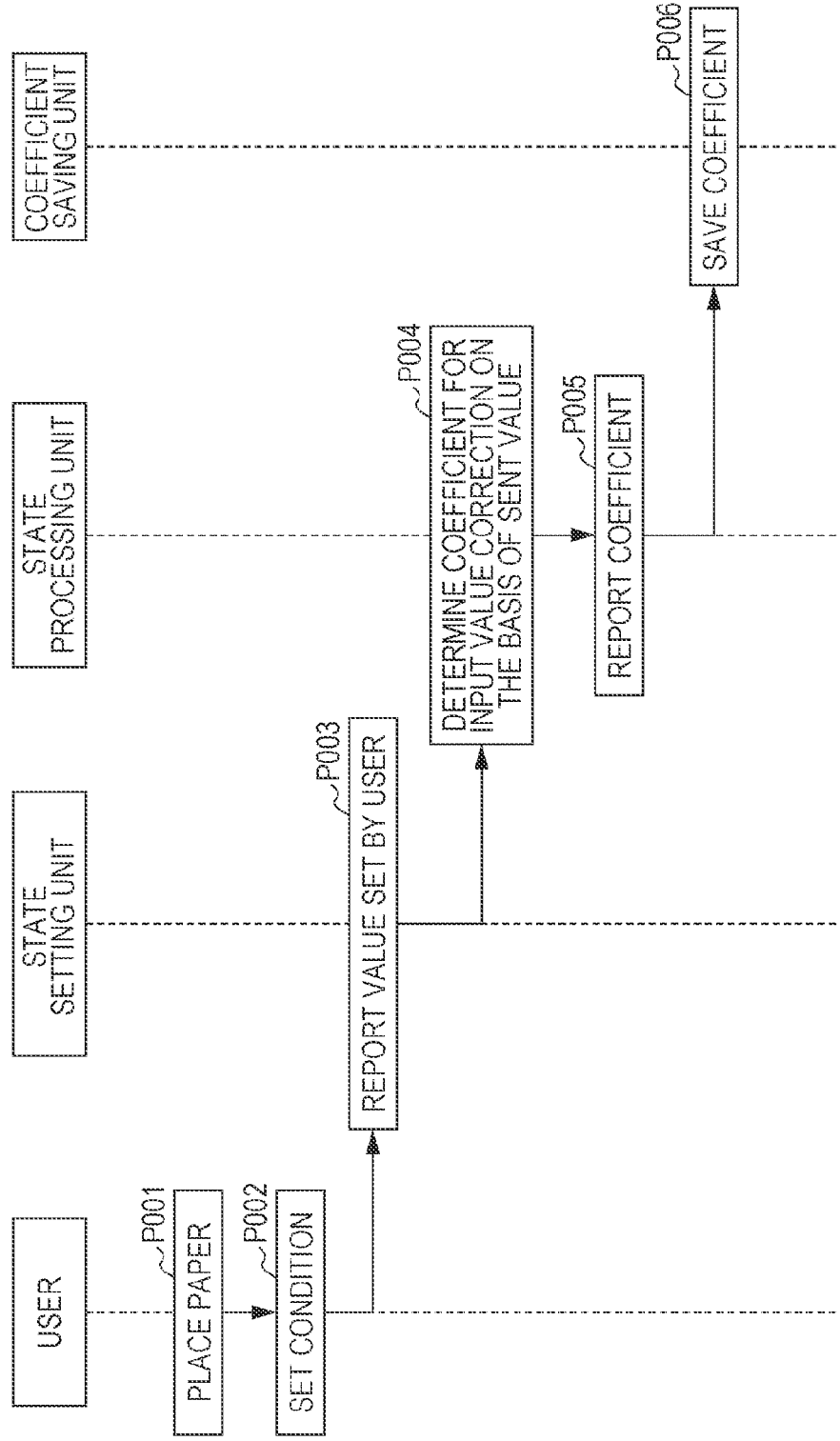

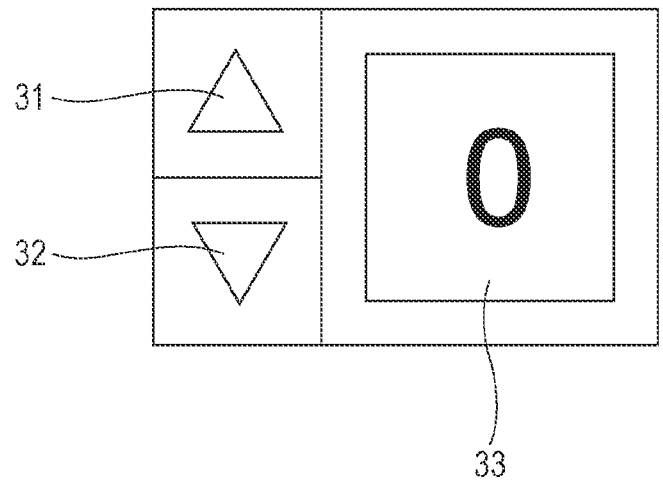

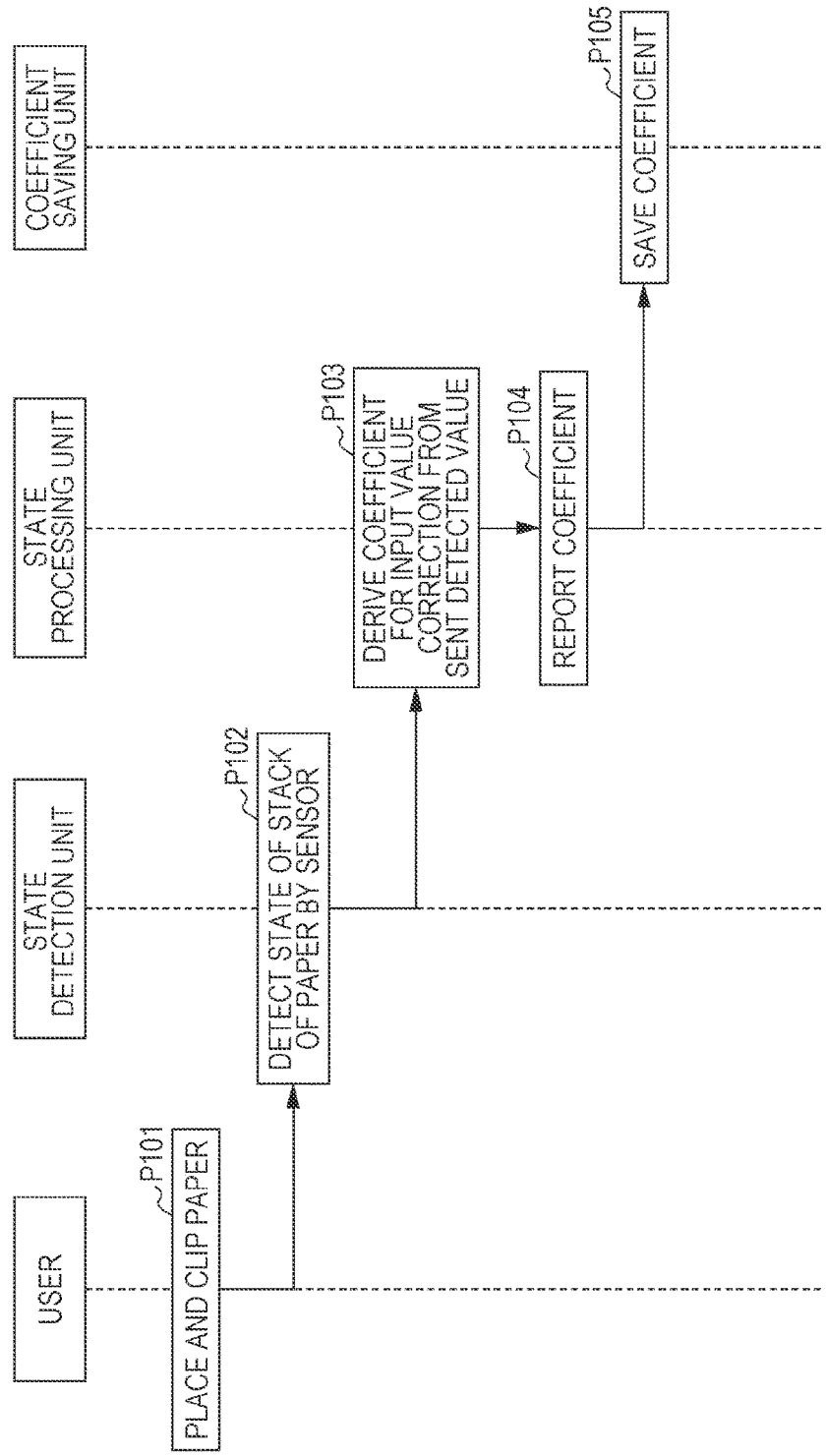

▬▬ CONTACT PORTION OF CLIP PART
▭▭ PORTION DETECTED BY INPUT DETECTION UNIT

INPUT DEVICE, INPUT VALUE CORRECTION METHOD, AND PROGRAM

The entire disclosure of Japanese Patent Application No. 2013-227167 filed on Oct. 31, 2013 including description, claims, drawings, and abstract are incorporated herein by reference in its entirety.

BACKGROUND OF THE INVENTION

Field of the Invention

The present invention relates to input devices and the like configured to receive inputs entered using a pen and the like through sheets such as paper placed on a detection surface.

Description of the Related Art

There are input devices configured to detect the pressure of a writing material by a pad-like touch panel laid immediately under paper to write on to receive inputs of character information (refer to JP 2006-172230 A, for example).

When an input entered by a writing material such as a pen is received via sheets placed on a touch panel, the pressure applied by the writing material is dispersed by the sheets and there is thus a difference between the area (width and thickness) of the pen nib of the writing material and the area of the pen nib detected by the touch panel via the sheets. For example, when a single thin sheet 201 is placed on a touch panel 200 as shown in FIG. 13A, the difference between the area S1 of a pen nib of a writing material 202 and the area S2 of the pen nib detected by the touch panel 200 via the sheet 201 is small, which is not often a problem. When, however, multiple sheets 203 are placed or a sheet 203 is thick or hard as shown in FIG. 13B, the difference between the area S1 of the pen nib of the writing material 202 and the area S3 of the pen nib detected by the touch panel 200 is larger, which may result in that a character or the like is input with such a thickness that is not intended by the user.

Furthermore, the area S3 of the pen nib detected when an input is entered by the pen 202 via multiple sheets 203 becomes close to the area (thickness of finger) S4 detected by the touch panel 200 when input is entered by a finger 204 via a single sheet (see FIG. 13C). Thus, if whether an input is entered by a finger or a pen is determined on the basis of the detected size of the area, an input entered by a pen may be erroneously detected to be an input entered by a finger.

SUMMARY OF THE INVENTION

The present invention has been made to solve the aforementioned problems and an object thereof is to provide an input device, a program, and an input value correction method capable of correctly recognize the size of a writing material or the like and receive input via a sheet.

A summary of the present invention to achieve at least one of the objects resides in the inventions in the following items.

To achieve at least one of the above-mentioned objects, according to an aspect, an input device comprises: an input detector that detects a portion of a detection surface pressed by a position specifying object via a sheet placed on the detection surface; a correction information acquisitor that acquires correction information to correct a difference between a shape of a contact portion of the position specifying object in contact with the sheet and a shape of a portion pressed by the contact portion detected by the input detector; and a corrector that corrects a value detected by the input detector on the basis of the correction information acquired by the correction information acquisitor.

To achieve at least one of the above-mentioned objects, according to an aspect, an input value correction method for correcting a value detected by an input detector that detects a portion of a detection surface pressed by a position specifying object via a sheet placed on the detection surface comprises: acquiring correction information for correcting a difference between a shape of a contact portion of the position specifying object in contact with the sheet and a shape of a portion pressed by the contact portion via the sheet detected by the input detector; and correcting the value detected by the input detector on the basis of the correction information.

To achieve at least one of the above-mentioned objects, according to an aspect, a non-transitory recording medium storing a computer readable program for causing an information processing device to function as the input device, the information processing device including an input detector that detects a portion of a detection surface pressed by a position specifying object such as a pen via a sheet placed on the detection surface.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a sequence diagram showing operation of determining a coefficient for correction on the basis of a setting value received by the state setting unit and saving the coefficient (operation corresponding to step S101 of FIG. 4);

FIG. 7 is a diagram showing an example of an operation display unit receiving a setting of the number of sheets;

FIG. 8 is a diagram showing an example of a coefficient determination table;

FIG. 9 is a sequence diagram showing operation of determining a coefficient for correction on the basis of a sensor output value from a state detection unit and saving the coefficient;

DESCRIPTION OF THE PREFERRED EMBODIMENTS

Hereinafter, an embodiment of the present invention will be described with reference to the drawings. However, the scope of the invention is not limited to the illustrated examples.

Figure 1:
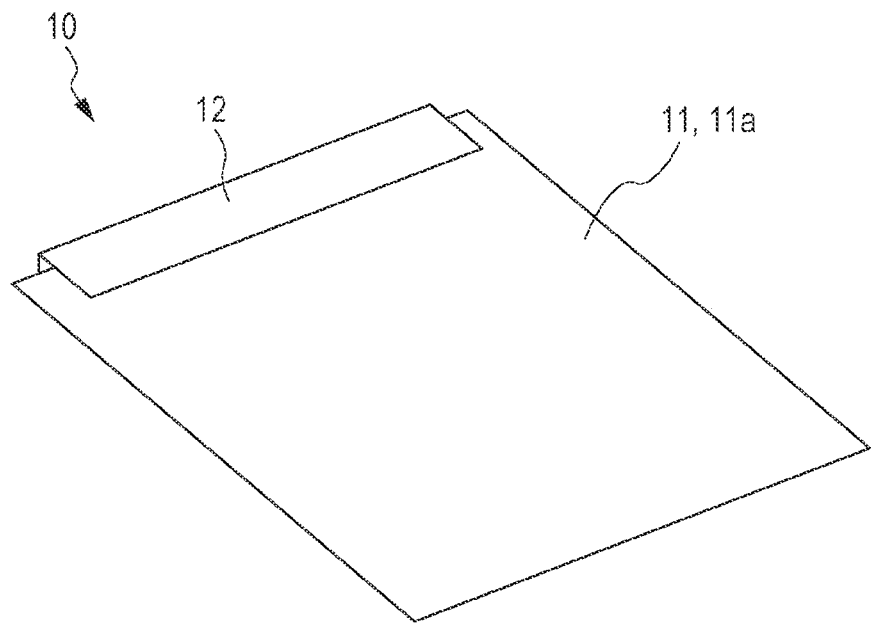
FIG. 1 is a perspective view showing an external appearance of an input device according to an embodiment of the present invention.
Figure 2:
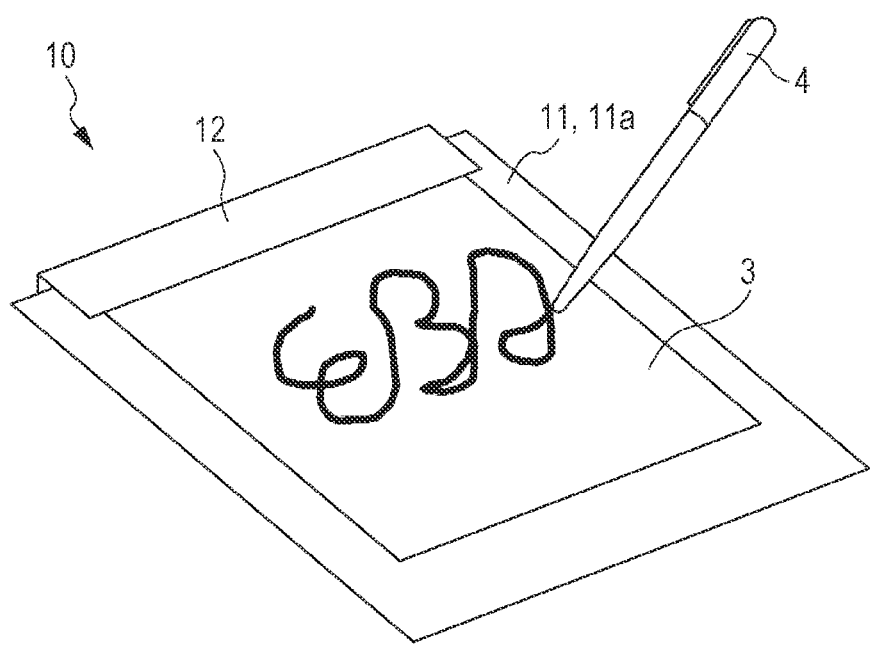
FIG. 2 is an explanatory view showing an example of the input device according to the embodiment of the present invention in a use state.

FIG. 1 shows an external appearance of an input device 10 according to the embodiment of the present invention. FIG. 2 shows an example of a use state of the input device 10. The input device 10 includes an input detection unit 11 that is a pad-like touch panel having a flat, rectangular plate-like shape, and a clip part 12 to hold sheets 3 such as paper placed on a detection surface 11a of the input detection unit 11 on the detection surface 11a.

The input device 10 detects an entry input on the sheets 3 placed on the detection surface 11a of the input detection unit 11 using a pen 4 or the like by a user. Specifically, the input detection unit 11 sequentially detects portions to which pressure is applied as a result of being pressed by a pen nib or the like via the sheets 3 to detect a track of the pen nib. Inputs are also entered by a finger, an eraser, and the like in addition to the pen 4. Hereinafter, pens, fingers, erasers and the like to enter inputs to the input detection unit 11 will be collectively referred to as position specifying objects.

Detection by the input detection unit 11 is repeated at short time intervals such as 0.05 seconds. Thus, a shape (width or area) of a portion in contact with a position specifying object in a static state is detected in one detection even while the position specifying object is being moved to input a character or the like. As a result of repeating the detection, a motion (track) of the position specifying object is recognized. Herein, the input detection unit 11 is a digital resistive touch panel configured to detect inputs entered by the pen 4 and the like.

Figure 3:
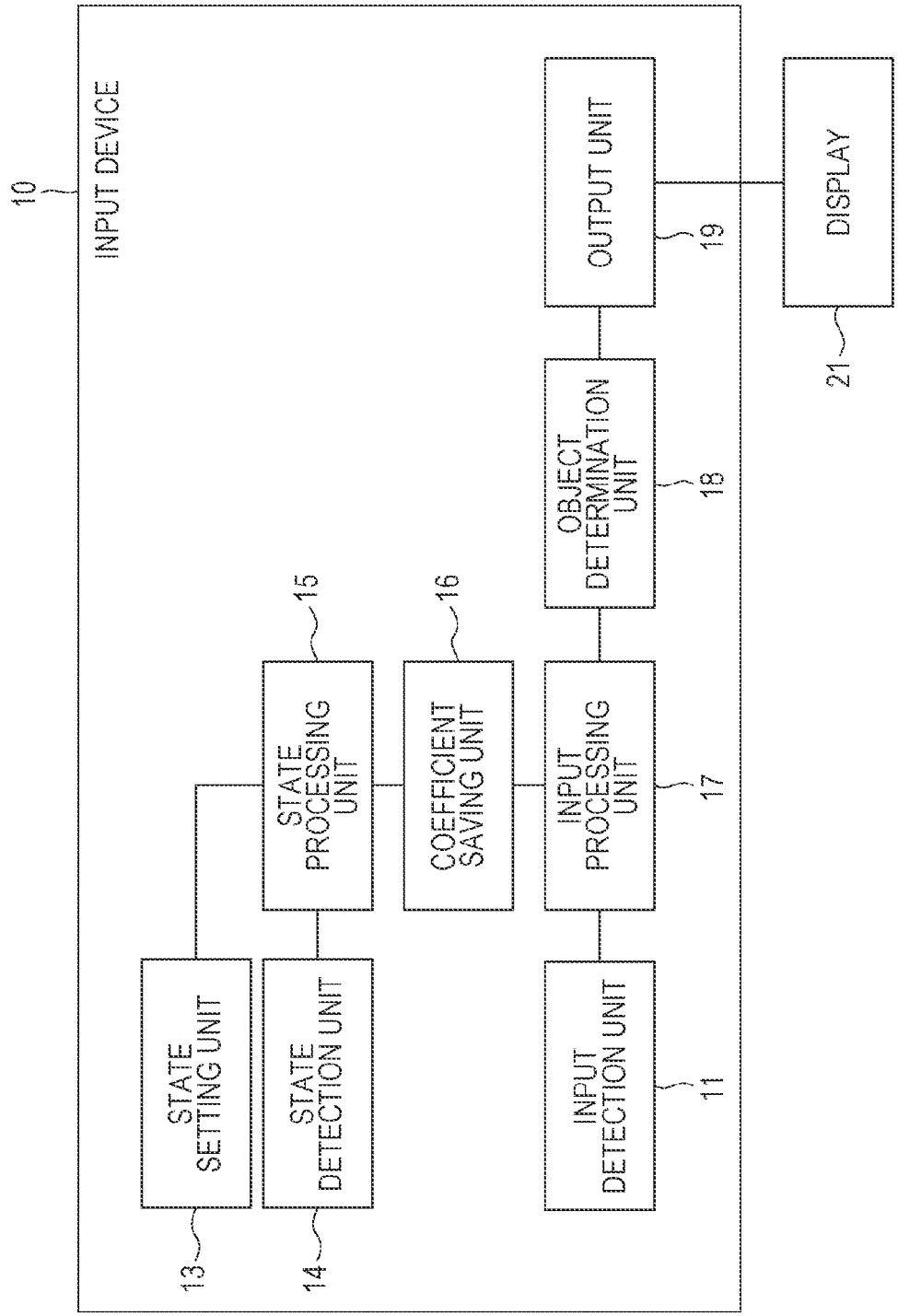
FIG. 3 is a block diagram showing a schematic configuration of the input device according to the embodiment of the present invention.

FIG. 3 is a block diagram showing a schematic configuration of the input device 10. The input device 10 includes the input detection unit 11, a state setting unit 13, a state detection unit 14, a state processing unit 15, a coefficient saving unit 16, an input processing unit 17, an object determination unit 18, an output unit 19, etc. The input device 10 has a CPU (Central Processing Unit) to which a ROM (Read Only Memory), a RAM (Random Access Memory), the input detection unit 11, the state setting unit 13, the output unit 19, etc., are connected, and functions of the input device 10 are implemented by executing programs stored in the ROM by the CPU, for example.

The state setting unit 13 and the state detection unit 14 acquire correction information to correct a difference between the shape (width or area) of a contact portion where the position specifying object entering input to the sheets 3 placed on the detection surface 11a of the input detection unit 11 is in contact with the sheets 3 and the shape of a portion pressed by the contact portion detected by the input detection unit 11.

The state setting unit 13 receives setting of information on the sheets 3, the pen 4, and the like from the user as the correction information. For example, the state setting unit 13 receives setting of information on the number and the type of sheets 3 placed on the detection surface 11a of the input detection unit 11 (information on pressure dispersion characteristics of the sheets 3), the type, the width of the pen nib (pen size φ), etc., of the position specifying object being used. The item to be set may be one of the aforementioned items or may be a combination of multiple items. Note that the pressure dispersion characteristics are characteristics relating to how the pressure applied to the front face (upper face) of the sheets 3 placed on the detection surface 11a of the input detection unit 11 is dispersed and transmitted to the rear face (lower face) of the sheets.

The state detection unit 14 includes various sensors to acquire the correction information. For example, the state detection unit 14 detects the pressed area of the clip part 12, the angle of the clip part 12, the weight of the input device 10, and the like.

The state processing unit 15 derives a coefficient for correcting a detected value from the input detection unit 11 from a setting value received by the state setting unit 13 or an output value from a sensor of the state detection unit 14. For example, the state processing unit 15 obtains a coefficient for correcting the shape (width or area) of the contact portion (such as the pen nib) of the position specifying object detected by the input detection unit 11 via the sheets 3 to the width or area of the contact portion of the position specifying object actually pressing the sheets 3. Specifically, the coefficient is obtained by substituting a setting value received by the state setting unit 13 or an output value from the state detection unit 14 into a certain expression or by referring to a predetermined coefficient determination table using a setting value received by the state setting unit 13 and an output value from the state detection unit 14.

The coefficient saving unit 16 stores the coefficient obtained by the state processing unit 15. The storage location may be the RAM or the like of the input device 10.

The input processing unit 17 corrects a detected value corresponding to the width or area of the contact portion of the position specifying object detected by the input detection unit 11 with the coefficient saved in the coefficient saving unit 16, and estimates the actual width or area of the contact portion of the position specifying object.

The object determination unit 18 determines the type of the position specifying object on the basis of the widths and areas of the contact portion of the position specifying object before and after correction by the input processing unit 17 and the detected motion of the contact portion of the position specifying object. Here, it is determined whether or not the position specifying object is a pen, a correction pen, a finger, an eraser or the like.

The output unit 19 performs an output in response to an input detected by the input detection unit 11 depending on the type of the position specifying object indicated by the determination result from the object determination unit 18. For example, if the position specifying object is determined to be a pen, a track of the pen is output. If the position specifying object is determined to be a finger, the input is handled as an input of gesture and a process for the input gesture is performed. Examples of the gesture include a flick, a pinch-in, and a pinch-out. If the position specifying object is determined to be an eraser, a process of erasing an entry existing at the portion corresponding to the track of the position specifying object is performed. The destination of an output is a display 21, a file system, a PC (personal computer), or the like connected to the output unit 19.

Figure 4:
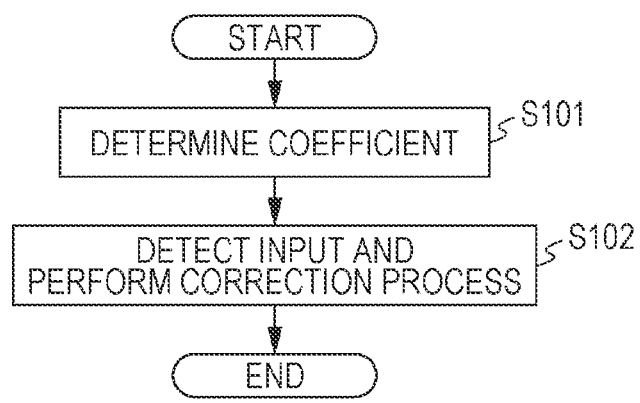
FIG. 4 is a flowchart showing an outline of processes performed by the input device according to the embodiment of the present invention.

FIG. 4 shows an outline of processes performed by the input device 10. The input device 10 first performs a process of determining a coefficient (step S101), and subsequently performs processes of detecting an input and correcting and outputting the detected value by the input detection unit 11 (step S102). In the process of determining a coefficient, a coefficient may be determined on the basis of a setting value received from the user by the state setting unit 13 or may be determined on the basis of an output value from a sensor of the state detection unit 14.

Figure 5:
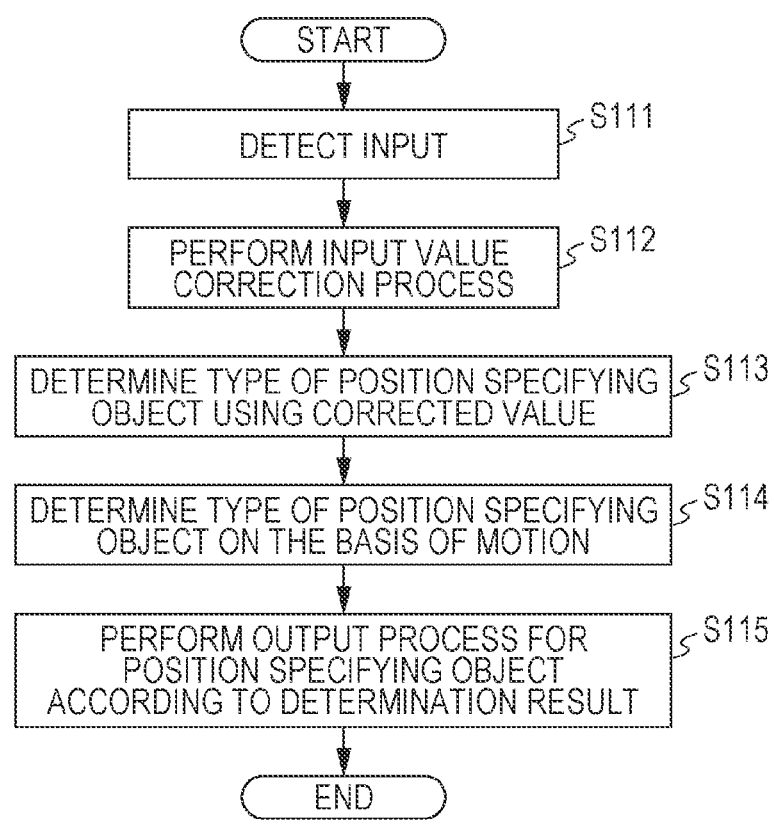
FIG. 5 is a flowchart showing details of processes of detecting input, correcting the detected value, and outputting the corrected value performed by an input detection unit (step S102 of FIG. 4)

FIG. 5 shows details of the processes of detecting input, correcting the detected value, and outputting the corrected value performed by the input detection unit 11 (step S102 of FIG. 4). First, an input is detected by the input detection unit 11 (step S111). Specifically, the position on the detection surface 11a of the input detection unit 11 pressed by a contact portion of the position specifying object and the shape (width or area) of the portion are detected.

Subsequently, an input value correction process of correcting the value detected by the input detection unit 11 on the basis of the coefficient obtained in step S101 of FIG. 4 is performed (step S112).

Subsequently, a process of determining the type of the position specifying object on the basis of the corrected value is performed (step S113). In this process, a range of the width or area of a contact portion of the position specifying object are set in advance for each position specifying object, and the type of the position specifying object is determined on the basis of the range of the type of the position specifying object within which the value of the width or area of the contact portion of the position specifying object obtained by correcting the detected value falls.

Subsequently, a process of determining the type of the position specifying object on the basis of the motion of the position specifying object is performed (step S114). For example, if the type of the position specifying object is determined to be a pen in step S113, and if the motion is such that the pen nib is drawing small circles while moving, the entry is determined to be erasure with a correction pen. Otherwise, the entry is determined to be an entry of a character or the like with a normal pen. Since it is difficult to clearly distinguish a finger from an eraser only on the basis of the width or area of the contact portion of the position specifying object, the position specifying object may be determined to be a finger or an eraser in step S113. In this case, the position specifying object may be determined to be an eraser if the motion is a small reciprocating motion or may be determined to be a finger if the motion is a specific gesture motion such as a pinch-out.

Then, an output process associated with the input is performed for the type of position specifying object that is determined finally (step S115). Specifically, a process of outputting a line corresponding to the currently input track is performed when the position specifying object is determined to be a pen, a process of whiting out or erasing an area corresponding to the currently input track when the position specifying object is determined to be a correction pen, a process of erasing a character and a line present in an area corresponding to the currently input track is performed when the position specifying object is determined to be an eraser, and a process corresponding to the gesture currently input is performed when the position specifying object is determined to be a finger.

FIG. 6 shows operation of determining a coefficient for correction on the basis of a setting value received by the state setting unit 13 and saving the coefficient (operation corresponding to step S101 of FIG. 4). First, the user places the sheet 3 on the detection surface 11a of the input detection unit 11 of the input device 10 (P001), and sets information on the sheet 3 and the pen 4 at the input detection unit 11 (P002). For example, an operation display unit 30 as shown in FIG. 7 receives the number of sheets 3 placed on the detection surface 11a.

The operation display unit 30 in FIG. 7 includes an up-pointing triangle operation button 31, a down-pointing triangle operation button 32, and a display unit 33 configured to display a currently-set number. The number is incremented by 1 each time the up-pointing triangle operation button 31 is pressed, and the number is decremented by 1 each time the down-pointing triangle operation button 32 is pressed, the lower limit being 0.

The information to be set is not limited to the number of sheets 3, but may be the type, the thickness of the sheet 3, the type of the position specifying object, and the width of the pen nib, and the like.

The description is continued referring back to FIG. 6. The state setting unit 13 that has received the setting informs the state processing unit 15 of the setting value (P003).

The state processing unit 15 determines a coefficient for correction on the basis of the setting value sent from the state setting unit 13 (P004).

FIG. 8 shows an example of a coefficient determination table 40 for obtaining a coefficient from a setting value. The coefficient determination table 40 is to obtain a coefficient from the number of sheets 3 and contains coefficient values associated with the respective numbers of sheets registered in advance. In the case where settings of the type and the number of sheets 3 are received, the coefficient determination table 40 of FIG. 8 may be provided for each type of the sheets 3 and a coefficient determination table 40 associated with the set type of sheets 3 may be referred to obtain a coefficient on the basis of the set number.

The description is continued referring back to FIG. 6. The state processing unit 15 informs the coefficient saving unit 16 of the determined coefficient (P005), and the coefficient saving unit 16 saves the coefficient (P006).

Next, operation of determining a coefficient for correction on the basis of a sensor output value from the state detection unit 14 and saving the coefficient will be described.

FIG. 9 shows operation of determining a coefficient for correction on the basis of a sensor output value from the state detection unit 14 and saving the coefficient. Herein, an example in which the detection surface 11a of the input detection unit 11 is also present at the portion (contact portion) where the clip part 12 clips and presses the sheets 3 and the coefficient is determined on the basis of the shape (width or area) of the contact portion of the clip part 12 detected by the input detection unit 11 will be described. Note that a pressure to detect the pressure by the clip part 12 via the sheets 3 may be provided separately from the input detection unit 11.

First, the user places the sheets 3 on the detection surface 11a of the input detection unit 11 of the input device 10, and clips the vicinity of an end of the sheets 3 by the clip part 12 (P101). The state detection unit 14 detects the state of the sheets 3 pressed by the clip part 12 by a sensor, and informs the state processing unit 15 of the detected value (P102). The state processing unit 15 determines a coefficient for correction on the basis of the detected value the state processing unit 15 is informed of (P103).

Herein, as described above, the input detection unit 11 functions as the state detection unit 14 to detect the shape of the portion pressed by the contact portion of the clip part 12 via the sheets 3. Alternatively, the detection may be performed by a separate sensor.

Figure 10A:
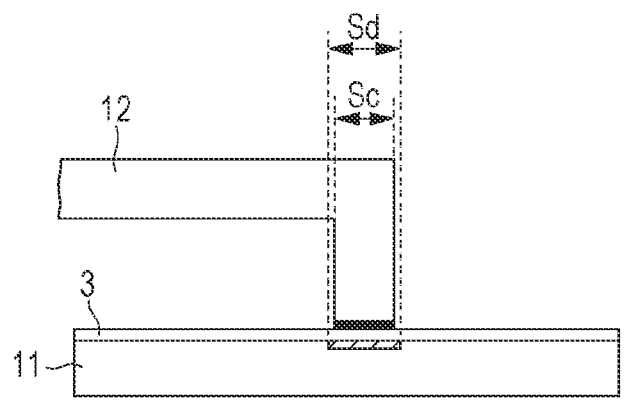
FIGS. 10A and 10B are diagrams showing that the area detected by the input detection unit varies depending on the number of sheets clipped by a clip part.
Figure 10B:
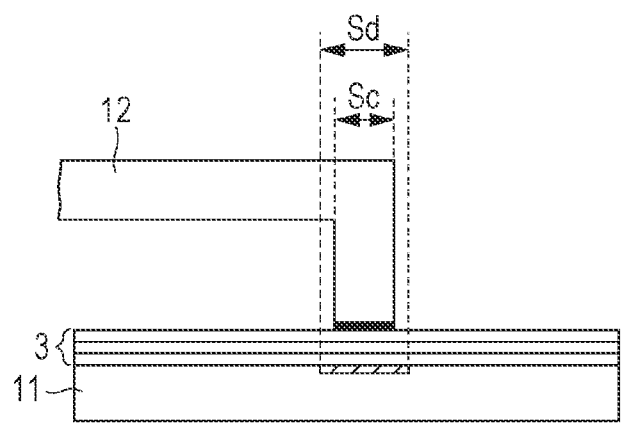

When the number of sheets 3 is one as shown in FIG. 10A, there is little difference between the shape (width or area) Sd of the contact portion of the clip part 12 detected by the state detection unit 14 (input detection unit 11) and the actual shape (width or area) Sc of the contact portion of the clip part 12. In contrast, when the number of sheets 3 is larger as shown in FIG. 10B, the pressure dispersion by the sheets 3 becomes larger correspondingly, and thus, the shape (width or area) Sd of the contact portion of the clip part 12 detected by the state detection unit 14 (input detection unit 11) is larger than the actual shape (width or area) Sc of the contact portion of the clip part 12.

Since the shape of the contact portion of the clip part 12 is fixed, it is possible to recognize how much pressure dispersion is caused by the sheets 3 on the basis of the shape (width or area) of the contact portion of the clip part 12 detected by the state detection unit 14 (input detection unit 11), and a coefficient for correction associated with the pressure dispersion is thus determined. Herein, an appropriate coefficient value associated with the shape (width or area) of the contact portion of the clip part 12 detected by the state detection unit 14 (input detection unit 11) is obtained in advance for each shape of the contact portion and the obtained values are stored in the form of a table like the coefficient determination table 40. The state processing unit 15 then refers to the table using the shape (width or area) of the contact portion of the clip part 12 detected by the state detection unit 14 (input detection unit 11) in P102 to determine a coefficient.

The state processing unit 15 informs the coefficient saving unit 16 of the determined coefficient (P104), and the coefficient saving unit 16 saves the coefficient (P105).

Note that the determination of a coefficient using a sensor is not limited to the above but may also be as follows.

(1) A coefficient is determined on the basis of a position of the input detection unit 11 pressed by the clip part 12.

Figure 11:
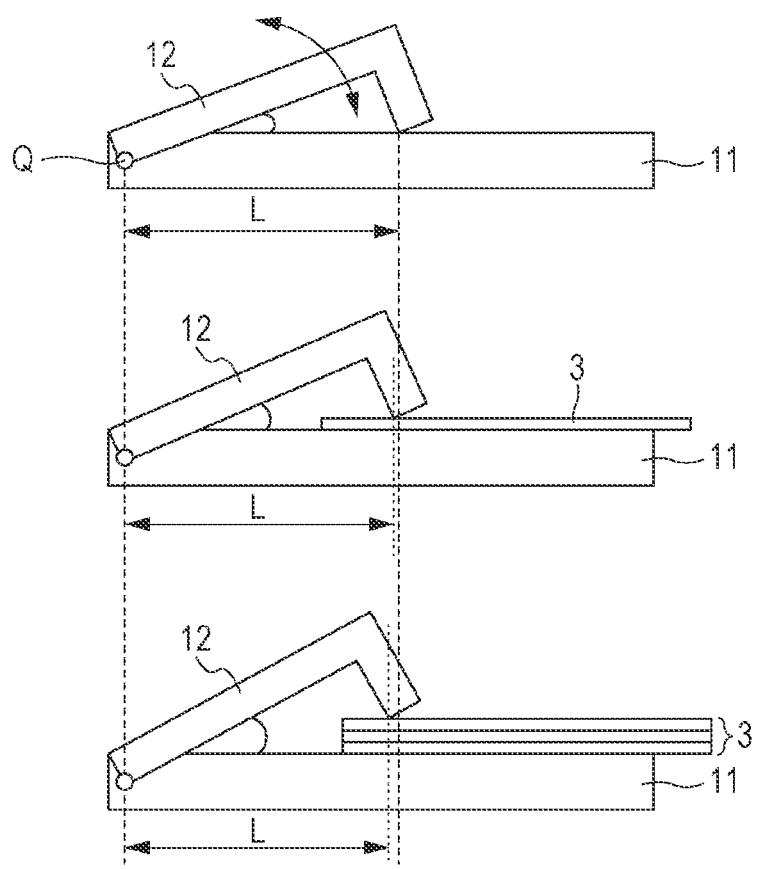
FIG. 11 is a diagram showing that the position of a pressed portion detected by the input detection unit and the angle of the clip part vary depending on the number of sheets clipped by the clip part.

As shown in FIG. 11, the clip part 12 is turned about one end Q thereof to press the sheets 3 against the detection surface 11a, and a coefficient is determined by estimating the number (thickness) of sheets 3 clipped by the clip part 12 on the basis of the distance (L) between a predetermined position (turning center Q, for example) in the radial direction of turning of the clip part 12 on the detection surface 11a and the contact portion of the clip part 12 detected by the input detection unit 11. In FIG. 11, the distance L is shorter as the number (thickness) of the sheets 3 clipped by the clip part 12 is larger. For example, a coefficient determination table in which a coefficient value associated with each distance L is registered in advance is provided, and a coefficient is determined by referring to the table using a detected distance L.

(2) A coefficient is determined on the basis of the angle of the clip part 12.

A sensor (gyro sensor, for example) to detect the tilt angle of the clip part 12 shown in FIG. 11 is provided. The tilt angle of the clip part 12 varies depending on the number (thickness) of the sheets 3 clipped by the clip part 12. Thus, a coefficient is determined by estimating the number (thickness) of the sheets 3 clipped by the clip part 12 on the basis of the tilt angle. For example, a coefficient determination table in which a coefficient value associated with each tilt angle is registered in advance is provided, and a coefficient is determined by referring to the table using a tilt angle detected by the sensor.

Note that the mechanism for detecting the thickness of the sheets 3 is not limited to the above. For example, in the case of a clip part that moves up and down in the direction perpendicular to the detection surface 11a and biased toward the detection surface 11a, the thickness of the sheets 3 clipped between the clip part and the detection surface 11a is detected by a sensor for detecting the upper and lower positions of the clip.

(3) The force (pressure) per unit area received from the clip part 12 by the detection surface 11a of the input detection unit 11 that determines a coefficient on the basis of the pressure from the clip part 12 by the detection surface 11a of the input detection unit 11 is decreased owing to pressure dispersion as the number (thickness) of the sheets 3 clipped by the clip part 12 is larger. Thus, a coefficient is determined by detecting the pressure received from the clip part 12 by the input detection unit 11 and estimating the number (thickness) of the sheets 3 clipped by the clip part 12 on the basis of the pressure value. For example, a coefficient determination table in which a coefficient value associated with each pressure value is registered in advance is provided, and a coefficient is determined by referring to the table using a pressure value detected by the sensor.

(4) A coefficient is determined on the basis of the weight of sheets 3.

The number (thickness) of the sheets 3 is estimated on the basis of the weight of the sheets 3 placed on the detection surface 11a of the input detection unit 11. For example, a sensor for measuring the weight of the input device 10 is provided, and the number (thickness) of the sheets 3 are estimated on the basis of the difference between the weight of the input device 10 without the sheets 3 being placed and the weight of the input device 10 with the sheets 3 being placed. A coefficient determination table in which a coefficient value associated with each weight difference is registered in advance is provided, and a coefficient is determined by referring to the table using a detected weight difference.

(5) A coefficient is determined on the basis of light transmittance.

A sensor that irradiates one face of the sheets 3 placed on the detection surface 11a of the input detection unit 11 with light and detects light transmitted to the other face of the sheets 3 is provided, and a coefficient is determined by estimating the number (thickness) of the sheets 3 on the basis of the light transmittance. For example, a coefficient determination table in which a coefficient value associated with each transmittance is registered in advance is provided, and a coefficient is determined by referring to the table using a detected transmittance.

Figure 12:
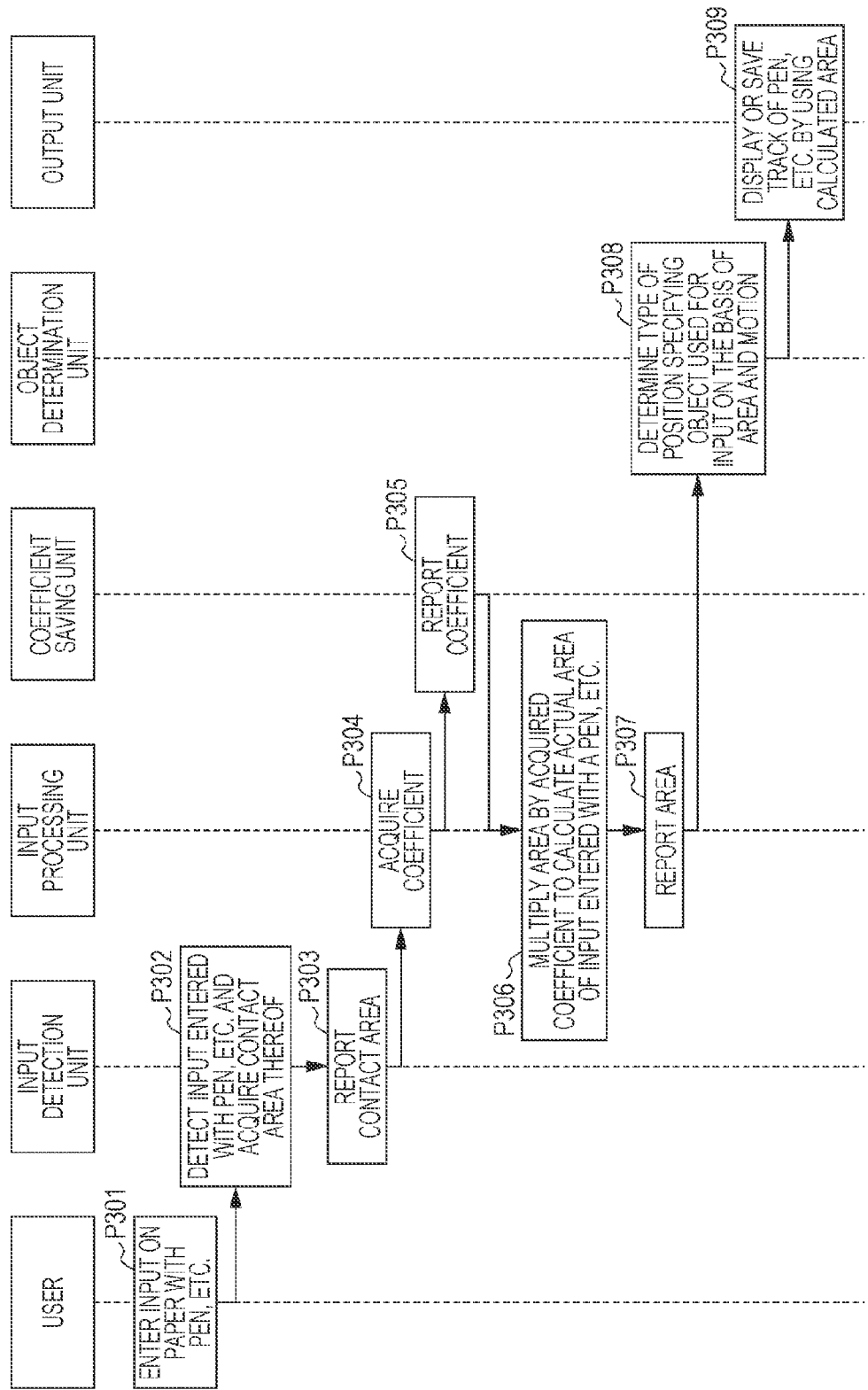
FIG. 12 is a sequence diagram showing operation when an input entered by a pen or the like is received (operation corresponding to step S102 of FIG. 4 and to FIG. 5)
Figures 13A, 13B, 13C:
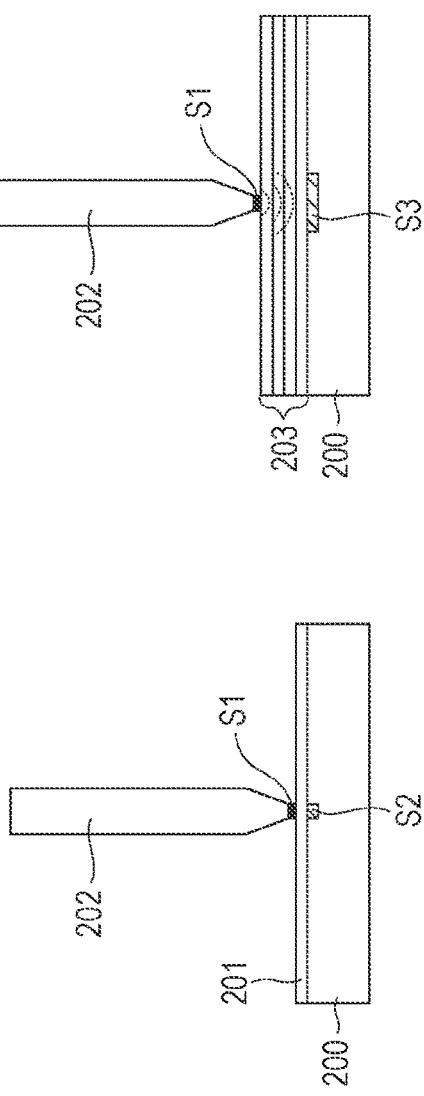
FIGS. 13A to 13C are diagrams showing that the area of a pen nib detected by a touch panel varies depending on the number of sheets placed on the touch panel.

FIG. 12 shows operation when an input entered by a pen or the like is received (operation corresponding to step S102 of FIG. 4 and to FIG. 5). The user writes on a sheet 3 placed on the detection surface 11a of the input detection unit 11 of the input device 10 with a position specifying object such as the pen 4 (P301). The input detection unit 11 detects the input entered by the position specifying object such as the pen 4. In this process, the input detection unit 11 also detects the shape (herein, the area) of the contact portion of the position specifying object (P302), and informs the input processing unit 17 of the detected shape (P303).

The input processing unit 17 acquires a coefficient associated with the state of the sheets 3 currently placed on the detection surface 11a from the coefficient saving unit 16 (P304, P305). The input processing unit 17 then corrects the area informed by the input detection unit 11 by multiplying the area by the coefficient acquired from the coefficient saving unit 16 to calculate the actual area of the contact portion of the position specifying object (P306). The input processing unit 17 informs the object determination unit 18 of the calculated area (P307).

The object determination unit 18 determines the type of the position specifying object on the basis of the informed area and the detected motion of the position specifying object (P308). The output unit 19 performs output associated with the determination result from the object determination unit 18. For example, if the determination result is a pen, the output unit 19 displays the track input by the pen by using the area calculated in P306 as the thickness of the pen nib. If the determination result is a correction pen, the output unit 19 performs a process of erasing the display using the area calculated in P306 as the thickness of the pen nib. If the determination result is a finger, the output unit 19 determines the type of gesture and performs a process associated with the gesture.

Since correction information for correcting the difference between the shape (width or area) of the contact portion of the position specifying object such as the pen 4 in contact with the sheets 3 and the shape (width or area) of the portion pressed by the contact portion detected by the input detection unit 11 is acquired and the value detected by the input detection unit 11 is corrected by using the coefficient obtained on the basis of the correction information as described above, an input in the state in which the sheets are clipped can be received with the thickness of the writing material, etc., being correctly recognized. Furthermore, in distinguishing a pen from a finger on the basis of an area, erroneous determination of a pen to be a finger can be prevented.

Although a coefficient is obtained for correction in the examples described above, correction information on the shape (width or area) of the contact portion of the position specifying object may be acquired, and the value detected by the input detection unit 11 may be corrected on the assumption that an input is entered with the shape indicated by the correction information.

Specifically, the state setting unit 13 receives a setting on the shape (width or area) of the contact portion of the position specifying object such as the pen nib from the user, corrects the shape (width or area) of the contact portion of the position specifying object detected by the input detection unit 11 by replacing the shape of the set shape (width or area), and receives the input from the position specifying object.

Alternatively, the state detection unit 14 may detect the shape (width or area) of the contact portion of the position specifying object such as the pen nib. For example, a test mode in which the state detection unit 14 receives a handwritten input entered by the position specifying object such as a pen used by the user directly by the detection surface 11a of the input detection unit 11 or the handwritten input is received in a state in which a predetermined sheet (a single standard sheet, for example) is placed on the detection surface 11a is provided, and the shape (width or area) of the contact portion of the position specifying object used by the user is detected through the test-writing in the test mode. Subsequently, in normal input detection in which any sheets 3 are clipped, the input detection unit 11 corrects the shape (width or area) of the contact portion of the position specifying object detected by the input detection unit 11 by replacing the shape with the shape of the contact portion detected in the test mode, and receives the input entered by the position specifying object.

Although an embodiment of the present invention has been described with reference to the drawings, specific configurations are not limited to those presented in the embodiment but any modifications and additions without departing the scope of the present invention are included in the present invention.

For example, although a digital resistive touch panel is used as the input detection unit 11 in the embodiment, the input detection unit 11 is not limited thereto and may be any touch panel configured to detect a portion pressed at a predetermined pressure or higher.

For correction using a coefficient, the shape of a pressed portion detected by the input detection unit 11 may be corrected to be a similar shape with a size reduced by a percentage indicated by the coefficient.

As described above, an input device according to an embodiment of the present invention has the following configuration.

[1] An input device including: an input detector that detects a portion of a detection surface pressed by a position specifying object via a sheet placed on the detection surface; a correction information acquisitor that acquires correction information to correct a difference between a shape of a contact portion of the position specifying object in contact with the sheet and a shape of a portion pressed by the contact portion detected by the input detector; and a corrector that corrects a value detected by the input detector on the basis of the correction information acquired by the correction information acquisitor.

With the input device described in [1] above and the input value correction method described in [11] below, an input can be received in the state in which the shape of the contact portion (such as a pen nib of a pen) of the position specifying object are correctly recognized independent of the number of sheets placed on the detection surface or the like.

[2] The input device of [1], wherein the correction information is information on pressure dispersion characteristics of a sheet.

With the input device described in [2] above and the input value correction method described in [12] below, the correction information is information on the characteristics (pressure dispersion characteristics) relating to how the pressure applied to one face of the sheet is dispersed and transmitted to the other face.

[3] The input device of [1] or [2], wherein the correction information includes any of the number, the type, the thickness, and the weight of sheets.

[4] The input device of [1] or [2], further including a clip part to press the sheet against the detection surface to hold the sheet, wherein the correction information acquisitor acquires an area or a pressure of a portion pressed by a contact portion of the clip part via the sheet detected by the input detector as the correction information.

With the input device described in [4] above and the input value correction method described in [14] below, since the actual area of the contact portion of the clip part is known in advance, a detected value can be corrected by acquiring the area of the contact portion of the clip part detected by the input detector as the correction information and thus recognizing how much the original area is enlarged by the presence of the sheet when detected. Furthermore, since the pressure at which the clip part presses sheets clipped by the clip part is dispersed and propagates, the number of sheets and the like can be estimated from the pressure detected via the sheets if the original pressure is known and a detected value for an input entered by the position specifying object via the sheets can thus be corrected.

[5] The input device of [1] or [2], further including a clip part configured to turn about one end thereof to press the sheet against the detection surface to hold the sheet, wherein the correction information acquisitor acquires a position of a portion pressed by a contact portion of the clip part via the sheet detected by the input detector relative to the center of the turning of the clip part or an angle of the clip part as the correction information.

With the input device described in [5] above and the input value correction method described in [15] below, since the position of the pressed portion detected by the input detection unit is shifted and the tilt of the clip part is increased as the number of sheets increases in a case of a structure in which the clip part turns about one end thereof to press the sheets against the detection surface at the other end thereof, the number of sheets can be estimated by detecting either of the position and the tilt and a detected value for an input entered by the position specifying object via the sheets can thus be corrected.

[6] The input device of [1] or [2], further including a sensor configured to irradiate one face of the sheet placed on the detection surface with light and detect light transmitted to the other face, wherein the correction information acquisitor acquires a transmittance of light detected by the sensor as the correction information.

With the input device described in [6] above and the input value correction method described in [16] below, the number of sheets is estimated by using the fact that the light transmittance is lowered as the number of sheets is increased, and a detected value for an input entered by the position specifying object via the sheets is thus corrected.

[7] The input device of [1], wherein the correction information is information on a shape of the contact portion of the position specifying object.

With the input device described in [7] above and the input value correction method described in [17] below, the correction information is information on the shape of the contact portion of the position specifying object, such as the shape (width or area) of a pen nib. If the shape (width or area) of the pen nib is known, the shape of the pressed portion detected by the input detector when an input is entered by the position specifying object via the sheets can be corrected to the actual shape of the pen nib.

[8] The input device of [7], wherein the correction information acquisitor acquires information on a shape of the contact portion of the position specifying object through test-writing in a test mode in which an input entered by the position specifying object is received directly by the detection surface or received in a state in which a predetermined sheet is placed on the detection surface.

With the input device described in [8] above and the input value correction method described in [18] below, information on the shape of the contact portion of the position specifying object is acquired through the test-writing in the test mode.

[9] The input device of [1], [2], [3], or [7], wherein the correction information acquisitor receives an input of the correction information from a user.

[10] The input device of [1], [2], [3] or [7], wherein the correction information acquisitor obtains the correction information from a value detected by a sensor.

[11] An input value correction method for correcting a value detected by an input detector that detects a portion of a detection surface pressed by a position specifying object via a sheet placed on the detection surface, the input value correction method including: acquiring correction information for correcting a difference between a shape of a contact portion of the position specifying object in contact with the sheet and a shape of a portion pressed by the contact portion via the sheet detected by the input detector; and correcting the value detected by the input detector on the basis of the correction information.

[12] The input value correction method of [11], wherein the correction information is information on pressure dispersion characteristics of a sheet.

[13] The input value correction method of [11] or [12], wherein the correction information includes any of the number, the type, the thickness, and the weight of sheets.

[14] The input value correction method of [11] or [12], wherein the input detector includes a clip part to press the sheet against the detection surface to hold the sheet, and the correction information is an area or a pressure of a portion pressed by a contact portion of the clip part via the sheet detected by the input detector.

[15] The input value correction method of [11] or [12], wherein the input detector includes a clip part configured to turn about one end thereof to press the sheet against the detection surface to hold the sheet, and the correction information is a position of a portion pressed by a contact portion of the clip part via the sheet detected by the input detector relative to the center of the turning of the clip part or an angle of the clip part.

[16] The input value correction method of [11] or [12], wherein the input detector includes a sensor configured to irradiate one face of the sheet placed on the detection surface with light and detect light transmitted to the other face, and the correction information is a transmittance of light detected by the sensor.

[17] The input value correction method of [11], wherein the correction information is information on a shape of the contact portion of the position specifying object.

[18] The input value correction method of [17], further including acquiring information on a shape of the contact portion of the position specifying object through test-writing in a test mode in which an input entered by the position specifying object is received directly by the detection surface or received in a state in which a predetermined sheet is placed on the detection surface.

[19] The input value correction method of [11], [12], [13], or [17], further including receiving an input of the correction information from a user.

[20] The input value correction method of [11], [12], [13], or [17], including acquiring the correction information from a value detected by a sensor.

[21] A non-transitory recording medium storing a computer readable program for causing an information processing device to function as the input device of any one of [1] to [10], the information processing device including an input detector that detects a portion of a detection surface pressed by a position specifying object such as a pen via a sheet placed on the detection surface.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An input device comprising:
an input detector that detects a portion of a detection surface pressed by a position specifying object via at least one sheet placed on the detection surface;
a correction information acquisitor that acquires correction information to correct a difference between a shape of a contact portion of the position specifying object in contact with the at least one sheet and a shape of a portion pressed by the contact portion detected by the input detector; and
a corrector that corrects a value detected by the input detector on the basis of the correction information acquired by the correction information acquisitor, wherein the correction information includes any of the number, the type, the thickness, and the weight of the at least one sheet.

2. The input device according to claim 1, wherein the correction information includes information on pressure dispersion characteristics of the at least one sheet.

3. The input device according to claim 1, further comprising a clip part to press the at least one sheet against the detection surface to hold the at least one sheet, wherein
the correction information acquisitor acquires an area or a pressure of a portion pressed by a contact portion of the clip part via the at least one sheet detected by the input detector as the correction information.

4. The input device according to claim 1, further comprising a clip part configured to turn about one end thereof to press the sheet against the detection surface to hold the at least one sheet, wherein
the correction information acquisitor acquires a position of a portion pressed by a contact portion of the clip part via the at least one sheet detected by the input detector relative to the center of the turning of the clip part or an angle of the clip part as the correction information.

5. The input device according to claim 1, further comprising a sensor configured to irradiate one face of the at least one sheet placed on the detection surface with light and detect light transmitted to the other face, wherein
the correction information acquisitor acquires a transmittance of light detected by the sensor as the correction information.

6. The input device according to claim 1, wherein the correction information includes information on a shape of the contact portion of the position specifying object.

7. The input device according to claim 6, wherein the correction information acquisitor acquires information on a shape of the contact portion of the position specifying object through test-writing in a test mode in which an input entered by the position specifying object is received directly by the detection surface or received in a state in which a predetermined sheet is placed on the detection surface.

8. The input device according to claim 1, wherein the correction information acquisitor receives an input of the correction information from a user.

9. The input device according to claim 1, wherein the correction information acquisitor obtains the correction information from a value detected by a sensor.

10. An input value correction method for correcting a value detected by an input detector that detects a portion of a detection surface pressed by a position specifying object via at least one sheet placed on the detection surface, the input value correction method comprising:
acquiring correction information for correcting a difference between a shape of a contact portion of the position specifying object in contact with the at least one sheet and a shape of a portion pressed by the contact portion via the at least one sheet detected by the input detector; and
correcting the value detected by the input detector on the basis of the correction information, wherein the correction information includes any of the number, the type, the thickness, and the weight of the at least one sheet.

11. The input value correction method according to claim 10, wherein the correction information includes information on pressure dispersion characteristics of the at least one sheet.

12. The input value correction method according to claim 10, wherein
the input detector includes a clip part to press the at least one sheet against the detection surface to hold the at least one sheet, and
the correction information is acquired based on an area or a pressure of a portion pressed by a contact portion of the clip part via the at least one sheet detected by the input detector.

13. The input value correction method according to claim 10, wherein
the input detector includes a clip part configured to turn about one end thereof to press the at least one sheet against the detection surface to hold the at least one sheet, and
the correction information is acquired based on a position of a portion pressed by a contact portion of the clip part via the at least one sheet detected by the input detector relative to the center of the turning of the clip part or an angle of the clip part.

14. The input value correction method according to claim 10, wherein
the input detector includes a sensor configured to irradiate one face of the at least one sheet placed on the detection surface with light and detect light transmitted to the other face, and
the correction information is acquired based on a transmittance of light detected by the sensor.

15. The input value correction method according to claim 10, wherein the correction information includes information on a shape of the contact portion of the position specifying object.

16. The input value correction method according to claim 15, further comprising acquiring information on a shape of the contact portion of the position specifying object through test-writing in a test mode in which an input entered by the position specifying object is received directly by the detection surface or received in a state in which a predetermined sheet is placed on the detection surface.

17. The input value correction method according to claim 10, further comprising receiving an input of the correction information from a user.

18. The input value correction method according to claim 10, further comprising acquiring the correction information from a value detected by a sensor.

19. A non-transitory recording medium storing a computer readable program for causing an information processing device to function as the input device according to claim 1, the information processing device including an input detector that detects a portion of a detection surface pressed by a position specifying object via at least one sheet placed on the detection surface.

* * * * *